(12) United States Patent
Tripp et al.

(10) Patent No.: US 12,735,128 B2
(45) Date of Patent: Sep. 15, 2026

(54) TRACKED VEHICLE TENSIONING

(71) Applicant: Howe & Howe Inc., Waterboro, ME (US)

(72) Inventors: Forrest Joel Tripp, East Waterboro, ME (US); Anthony Victor Castro, Cape Elizabeth, ME (US); William Edward McMaster, Lebanon, ME (US)

(73) Assignee: Howe & Howe Inc., Waterboro, ME (US)

( * ) Notice: Subject to any disclaimer, the term of this patent is extended or adjusted under 35 U.S.C. 154(b) by 346 days.

(21) Appl. No.: 18/475,072

(22) Filed: Sep. 26, 2023

(65) Prior Publication Data

US 2024/0101200 A1 Mar. 28, 2024

Related U.S. Application Data

(60) Provisional application No. 63/466,098, filed on May 12, 2023, provisional application No. 63/410,096, filed on Sep. 26, 2022.

(51) Int. Cl.

| | |
|---|---|
| ***B62D 55/30*** | (2006.01) |
| ***B62D 55/104*** | (2006.01) |
| ***B62D 55/15*** | (2006.01) |

(52) U.S. Cl.

CPC ........... *B62D 55/30* (2013.01); *B62D 55/104* (2013.01); *B62D 55/15* (2013.01)

(58) Field of Classification Search

CPC ...... B62D 55/30; B62D 55/104; B62D 55/15; B62D 55/32

See application file for complete search history.

(56) References Cited

U.S. PATENT DOCUMENTS 2,467,947 A * 4/1949 Skelton .............. B62D 49/0635 180/9.62
3,913,694 A * 10/1975 Forsgren ................ B62M 27/02 305/128
5,370,198 A * 12/1994 Karpik .................. B62M 27/02 180/9.56

(Continued)

FOREIGN PATENT DOCUMENTS

CN 108238121 A * 7/2018 ............. B62D 55/08
CN 112550503 3/2021

(Continued)

OTHER PUBLICATIONS

International Search Report and Written Opinion for PCT application No. PCT/US2023/033748, dated Feb. 6, 2024, 21 pages.

(Continued)

*Primary Examiner* — John Olszewski
*Assistant Examiner* — Matthew D Lee
(74) *Attorney, Agent, or Firm* — BainwoodHuang

(57) ABSTRACT

A track tensioning mechanism and method includes a bracket assembly coupled to an axle of a tensioner wheel configured to engage a track to be tensioned. The bracket assembly has its own axle, which is configured to rotatably engage with a body of the vehicle. The axle of the bracket assembly is laterally offset from the axle of the tensioner wheel, enabling the track to be loosened or tightened by rotating the bracket assembly about its own axle between first and second positions.

19 Claims, 6 Drawing Sheets

(56) References Cited

U.S. PATENT DOCUMENTS

| | | | | |
|---|---|---|---|---|
| 6,158,827 | A * | 12/2000 | Hostetler | B62D 55/30 305/125 |
| 8,474,554 | B2 | 7/2013 | Howe et al. | |
| 11,427,270 | B2 | 8/2022 | Howe et al. | |
| 2001/0023787 | A1* | 9/2001 | Mallette | B62M 27/02 180/182 |
| 2003/0034191 | A1* | 2/2003 | Karpik | B62D 55/108 180/9.54 |
| 2005/0252592 | A1* | 11/2005 | Albright | B62D 55/32 152/379.3 |
| 2019/0217906 | A1* | 7/2019 | Lavallee | B62D 55/104 |
| 2020/0377162 | A1* | 12/2020 | Howe | B62D 55/04 |
| 2021/0108895 | A1 | 4/2021 | Howe et al. | |
| 2022/0212735 | A1* | 7/2022 | Yan | B62D 55/104 |
| 2023/0088778 | A1* | 3/2023 | Allen | B62D 55/10 180/9.5 |

FOREIGN PATENT DOCUMENTS

| | | | | |
|---|---|---|---|---|
| EP | 1114766 | A2 * | 7/2001 | B62D 55/305 |
| FR | 1401309 | A * | 6/1965 | B62D 55/116 |
| GB | 991668 | | 5/1965 | |
| JP | 2020007775 | A * | 1/2020 | |
| WO | WO-2010071552 | A1 * | 6/2010 | B62D 55/305 |
| WO | 2017075652 | | 5/2017 | |

OTHER PUBLICATIONS

Tripp, Forrest Joel, et al.; “Adjustable Modular Supporting of Wheels of Tracked Vehicle,” U.S. Appl. No. 18/451,994, filed Aug. 18, 2023.

* cited by examiner

TRACKED VEHICLE TENSIONING

CROSS-REFERENCE TO RELATED APPLICATIONS

This application claims the benefit of U.S. Provisional Application No. 63/410,096, filed Sep. 26, 2022, and of U.S. Provisional Application No. 63/466,098, filed May 12, 2023. The contents and teachings of both provisional applications are incorporated herein by reference in their entirety.

BACKGROUND

1. Field

This disclosure relates generally to tracked vehicles, and more particularly to a technique for tensioning tracks on a tracked vehicle.

2. Description of Related Art

Tracked vehicles find common usage in moving equipment and/or personnel over uneven or unstable terrain, such as sand, gravel, dirt, snow, or mud. When a track is first installed on a tracked vehicle, the track generally requires tightening using some form of adjustment. Also, tracks may stretch or contract with usage or in different environments, resulting in a need for occasional adjustments in track tension.

Known track tensioning mechanisms typically include a tensioning wheel positioned at an end of a suspension carrier opposite from a drive sprocket that engages and turns the track. The tensioning wheel can be adjusted forward and back to achieve desired levels of track tension.

SUMMARY

Unfortunately, the above-described track tensioning mechanisms consume considerable space and can be slow to operate. For example, track tensioning mechanisms must typically cover a large range of adjustment to allow tracks to be loosely installed or removed and also to be tightened to desired levels. Providing a large range of adjustment can consume space and cause interference with other components of the tracked vehicle. Also, operating the tensioning mechanism over the large range of adjustment takes considerable time, particularly when changing tracks. What is needed, therefore, is a way to achieve track tensioning using less space and in less time.

The above-described needs are addressed at least in part by an improved technique that provides a track tensioning mechanism including a bracket assembly coupled to an axle of a tensioner wheel configured to engage a track to be tensioned. The bracket assembly has its own axle, which is configured to rotatably engage with a body of a vehicle. The axle of the bracket assembly is laterally offset from the axle of the tensioner wheel, enabling the track to be loosened or tightened by rotating the bracket assembly about its own axle between first and second positions.

Advantageously, the improved technique can occupy a smaller footprint than prior approaches, avoiding interference with other vehicle components. It can also be operated quickly, enabling fast tensioning and fast track changes.

Certain embodiments are directed to a tensioning mechanism for a tracked vehicle. The mechanism includes a tensioner wheel configured to engage a track to be tightened, the tensioner wheel having a first axle about which the tensioner wheel can rotate. The mechanism further includes a bracket assembly coupled to the first axle and having a second axle about which the bracket assembly can rotate relative to a body of the vehicle. The second axle is laterally offset from the first axle, enabling the track to be loosened or tightened by rotating the bracket assembly about the second axle between first and second positions.

In some examples, the first axle is parallel to the second axle.

In some examples, the bracket assembly includes a pry bar receiver constructed and arranged to receive a pry bar to be used when rotating the bracket assembly about the second axle between first and second positions.

In some examples, the bracket assembly includes a housing piece from which the second axle extends and a translating piece that extends between the housing piece and the first axle. The translating piece is configured to translate relative to the housing piece for varying a distance between the first axle and the second axle.

In some examples, the housing piece extends at least partially around the translating piece such that the translating piece can move back and forth within the housing piece.

In some examples, the translating piece is constructed and arranged to receive a screw that extends from a fixed point relative to the body of the vehicle and colinearly with the translating piece when the bracket assembly is in the second position. The screw is constructed and arranged to move the translating piece back and forth relative to the housing piece for tightening and loosening the track.

In some examples, the mechanism further includes a ladder of prying slots attached to or integral with the body of the vehicle, the ladder arranged in line with the screw and providing multiple slots in which a pry bar can be inserted for successively pushing the translating piece relative to the housing piece such that the translating piece can receive the screw when the bracket assembly is in the second position.

In some examples, the mechanism further includes upper and lower rails attached to or integral with the body of the vehicle and extending parallel to the translating piece when the bracket assembly is in the second position. The upper and lower rails are configured to engage upper and lower lips of the translating piece for holding the bracket assembly in the second position.

In some examples, the lower rail is moveable within a track, such that the lower rail can be moved within the track or removed from the track when rotating the bracket assembly about the second axle between the first and second positions, and such that the lower rail can be moved back or reinserted once the bracket assembly is in the second position.

In some examples, the mechanism further includes an opening at a side of the vehicle for receiving the second axle and a retainer adjacent to the opening. The housing piece includes a lip configured to engage the retainer when the bracket assembly is in the second position.

In some examples, the retainer adjacent to the opening includes a retainer lip and a spacer that forms a space between the retainer lip and the side of the vehicle. The lip of the housing piece is configured to enter the space between the retainer lip and the side of the vehicle when the bracket assembly is rotated from the first position to the second position.

Other embodiments are directed to a tracked vehicle that includes a body and first and second suspension carriers having respective tracks. Each of the first and second suspension carriers includes a tensioning mechanism that includes: a tensioner wheel configured to engage a track to be tightened, the tensioner wheel having a first axle about which the tensioner wheel can rotate; and a bracket assembly coupled to the first axle and having a second axle about which the bracket assembly can rotate relative to a body of the vehicle. The second axle is laterally offset from the first axle, enabling the track to be loosened or tightened by rotating the bracket assembly about the second axle between first and second positions.

Still further embodiments are directed to a method controlling tension of a track of a tracked vehicle. The method includes applying a bracket assembly to a body of the tracked vehicle by inserting an axle of the bracket assembly into an opening at a side of the vehicle. The bracket assembly has a translating piece coupled to an axle of a tensioner wheel around which the track turns, and the bracket assembly applied in a first position in which the track is loose. The method further includes rotating the bracket assembly about the axle of the bracket assembly from the first position to a second position, the track being tighter in the second position than it is in the first position.

In some examples, rotating the bracket assembly from the first position to the second position includes inserting a pry bar into a receiver of the bracket assembly and leveraging rotation of the bracket assembly using the pry bar.

In some examples, with the bracket assembly in the second position, the method further includes advancing the translating piece for establishing a desired track tension.

In some examples, rotating the bracket assembly from the first position to the second position includes engaging a lip of the bracket assembly with a retainer attached to or integral with the body of the vehicle.

In some examples, rotating the bracket assembly from the first position to the second position includes continuing to rotate until the translating piece engages an upper rail attached to or integral with the body of the vehicle.

In some examples, advancing the bracket assembly in the second position includes prying the translating piece such that the axle of the tensioner wheel extends farther away from the axle of the bracket assembly.

In some examples, advancing the bracket assembly in the second position includes engaging the translating piece with a lower rail attached to or integral with the body of the vehicle, such that the translating piece is held in the second position by both the upper rail from above and the lower rail from below.

In some examples, advancing the bracket assembly in the second position includes rotating a screw that extends from a fixed point relative to the body of the vehicle, such that the screw captures the translating piece and draws the axle of the tensioner wheel farther away from the axle of the bracket assembly.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique provides a track tensioning mechanism including a bracket assembly coupled to an axle of a tensioner wheel configured to engage a track to be tensioned. The bracket assembly has its own axle, which is configured to rotatably engage with a body of the vehicle. The axle of the bracket assembly is laterally offset from the axle of the tensioner wheel, enabling the track to be loosened or tightened by rotating the bracket assembly about its own axle between first and second positions.

Figure 1:
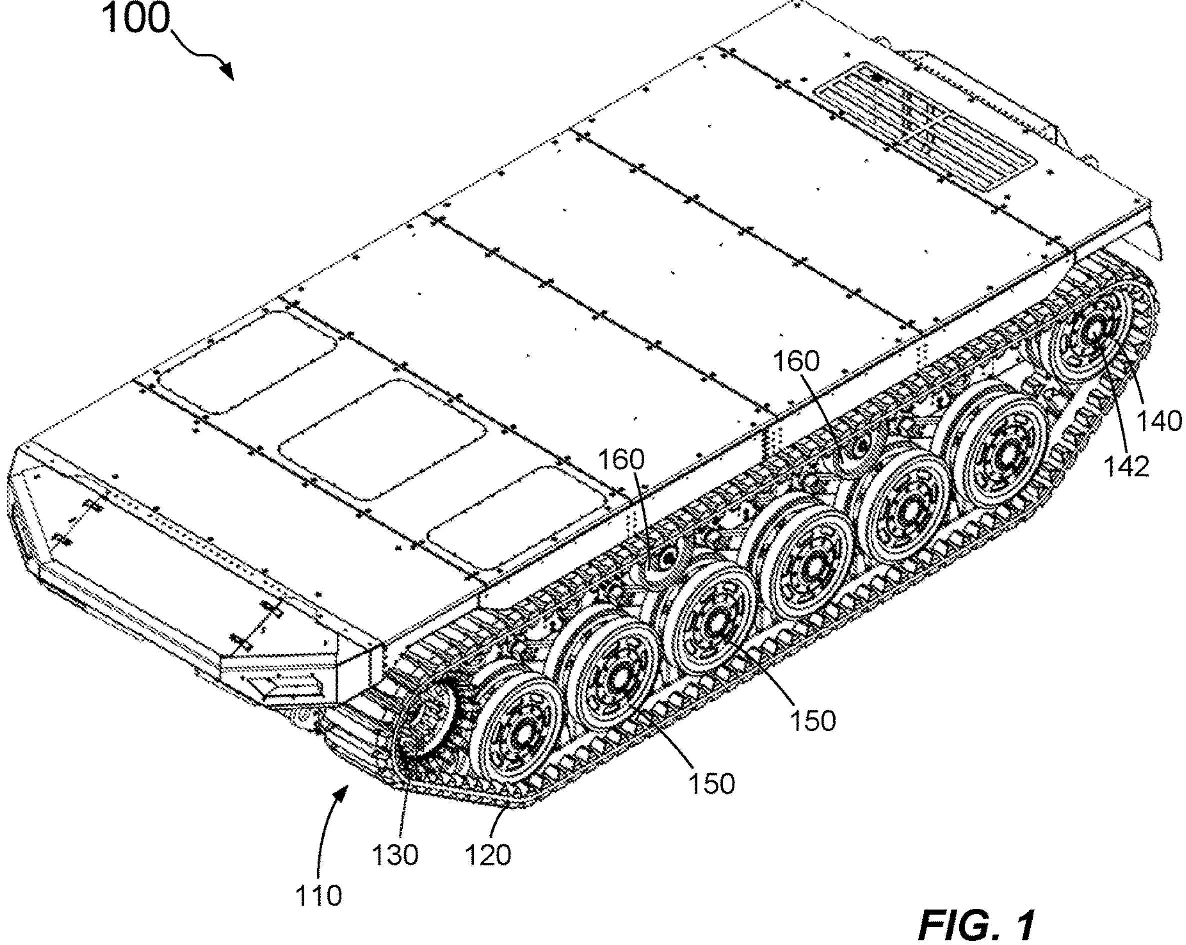
FIG. 1 is an isometric view of an example tracked vehicle in which certain embodiments can be practiced.

FIG. 1 shows an example tracked vehicle 100 in which embodiments of the improved technique can be practiced. The illustrated vehicle 100 includes left and right suspension carriers 110 for carrying respective tracks 120 (only one suspension carrier and track are visible), as well as various wheels around which the tracks move. The wheels include a drive sprocket 130, and a tensioner wheel 140, bottom wheels 150, and top wheels 160. The drive sprocket 130 may be coupled to a drive train (e.g., electric motor, fuel-powered engine, etc.). The tensioner wheel 140 is part of the disclosed track tensioner mechanism. For example, moving the tensioner wheel 140 backward (to the upper right from the perspective of FIG. 1) has the effect of tightening the track 120, while moving the tensioner wheel 140 forward (toward the lower left from the perspective of FIG. 1) has the effect of loosening the track 120.

Figure 2:
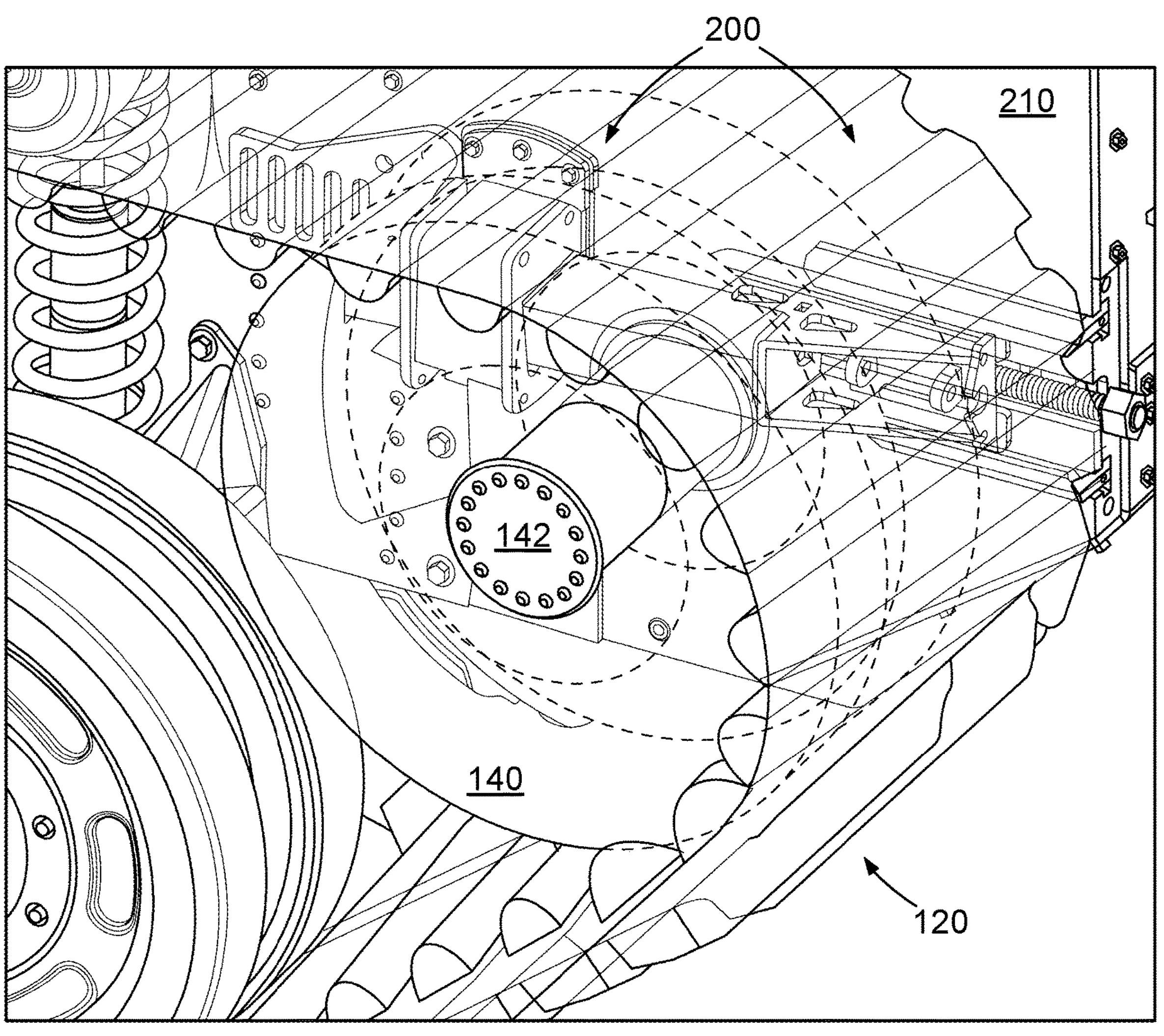
FIGS. 2-5 are perspective views of an example tensioner in accordance with certain embodiments.

FIG. 2 shows a partially transparent view of the tensioner wheel 140. Here, the position of the tensioner wheel 140 can be moved forward or back for adjusting tension on the track 120 using a tensioning mechanism 200. Certain parts of the track tensioning mechanism 200 are fixedly attached to a side of a body 210 of the tracked vehicle 100 whereas other parts can be removed.

Figure 3:
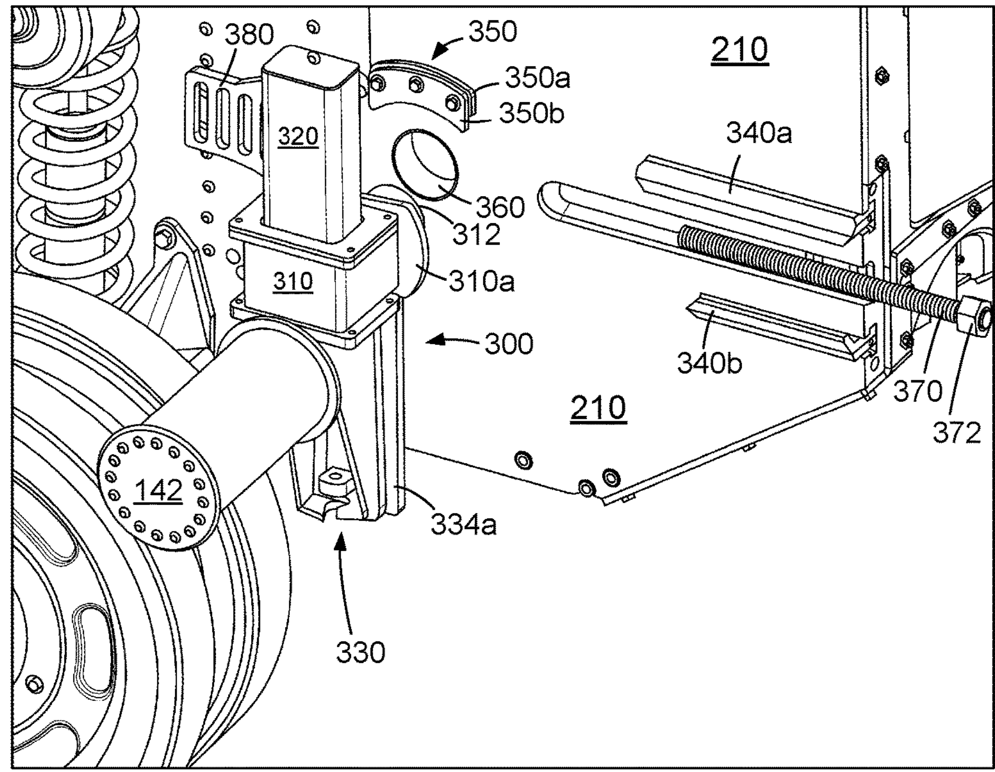
Figure 4:
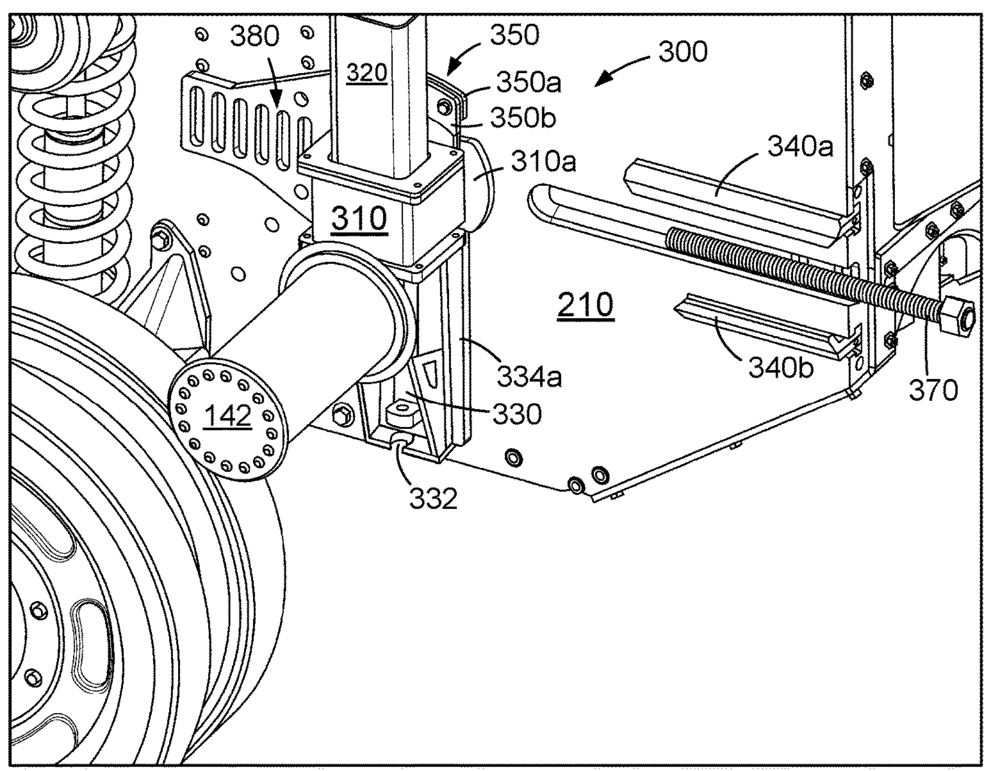
Figure 5:
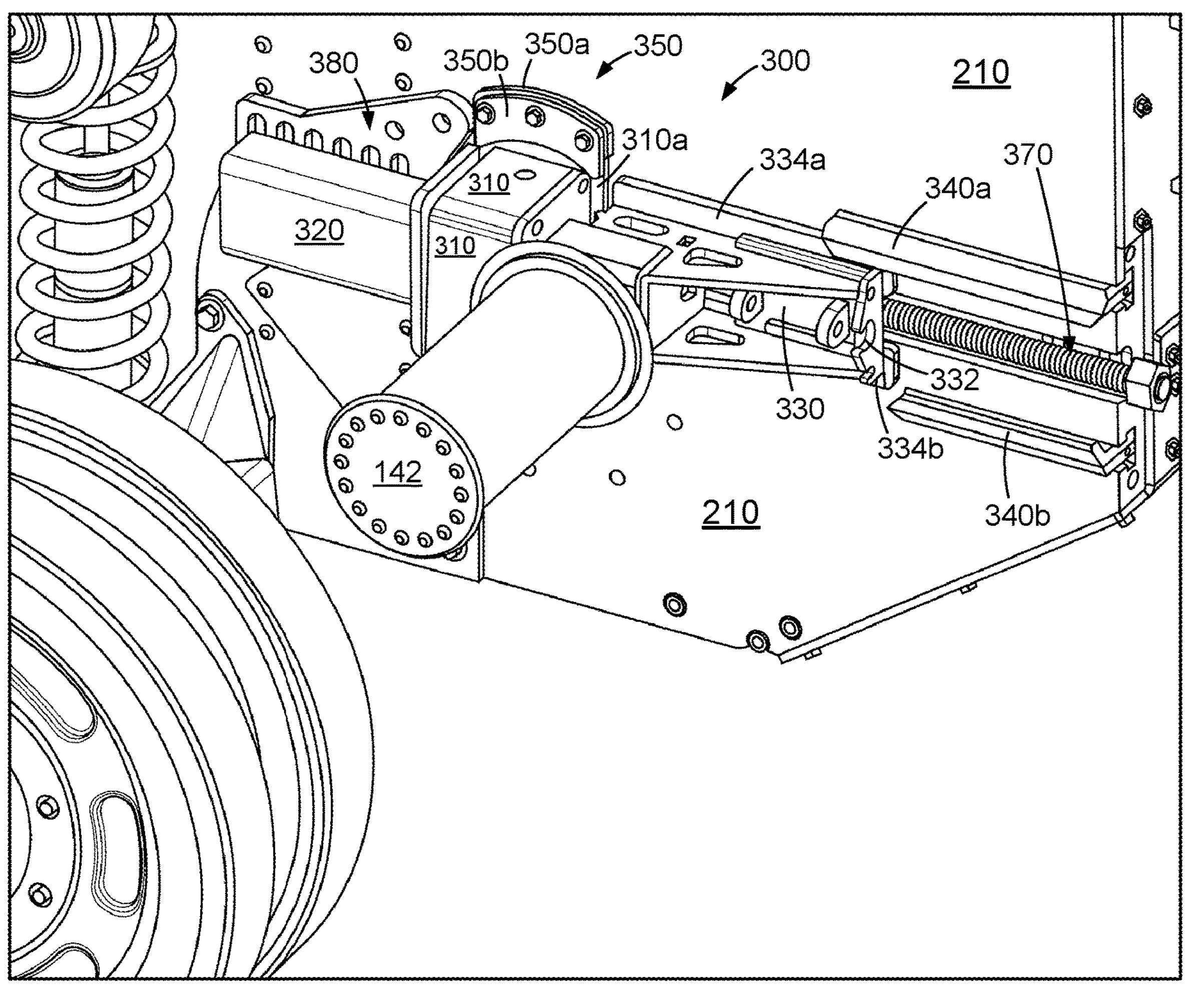

FIG. 3-5 show aspects of the track tensioning mechanism 200 in further detail. The tensioner wheel 140 and the track 120 are hidden in these figures to promote clarity.

FIG. 3 shows a bracket assembly 300 of the track tensioning mechanism 200 spaced away from the body 210 of the vehicle 100. The bracket assembly 300 includes a housing piece 310 and a translating piece 320. The housing piece 310 partially encloses the translation piece 320, such that the translating piece 320 is free to move back and forth (up and down in the perspective of FIG. 3) within the housing piece 310. The housing piece 310 includes an axle 312 that extends back from the housing piece 310. The axle 312 is constructed and arranged to fit within an opening 360, such as a bushing, in the side of the body 210. The housing piece 310 is then free to rotate about the axle 312. In the arrangement shown in FIG. 3, the axle 312 is not engaged with the opening 360 and the bracket assembly 300 is free to be moved around and angled as needed to apply the track 120 around the tensioner wheel 140.

FIG. 4 shows a similar arrangement, except that here the bracket assembly 300 is engaged with the opening 360, i.e., the axle 312 extending from the back of the housing portion 310 is inserted into the opening 360. The bracket assembly 300 is oriented in a first position, e.g., vertically, where the track 120 is under little if any tension. The bracket assembly 300 can then be rotated about the axle 312 to assume a second position (e.g., horizontal). For example, a pry bar (not shown) can be inserted into a receiver 332 of the translating piece 320 for leveraging rotation of the bracket assembly 300 from the first position to the second position.

In an example, a lip 310*a* of the housing piece 310 extends under a retaining lip 350*b* of a retainer 350 as the bracket assembly 300 is rotated. The retainer 350 is attached to or integral with the body 210. In an example, a spacer 350*a* spaces the retaining lip 350*b* slightly away from the body 210 and creates a space for the lip 310*a* to enter. The retainer 350 thus holds the bracket assembly 300 closely to the body 210 as the bracket assembly 300 enters the second position and while the bracket assembly 300 remains in the second position.

FIG. 5 shows the bracket assembly 300 in the second position (e.g., horizontal). In an example, an upper rail 340*a*, which is attached to or integral with the body 210, limits upward rotation of the bracket assembly 300 and aligns the bracket assembly for further tensioning. For example, the translating piece 320 includes an upper lip 334*a*, which engages the upper rail 340*a*. In an example, the upper rail 340*a* is substantially L-shaped or U-shaped, such that it includes a downward portion that holds the upper lip 334*a* against the body 210.

From here, the translating piece 320 may be urged to the right using a pry bar (not shown), e.g., by inserting a tip of the pry bar into prying slots of a ladder 380 and pushing the translating piece 320 to the right (from the perspective of the figure). Successive slots of ladder 380 may be used for anchoring the pry bar as the translating piece is pushed further and further to the right.

Eventually, the translating piece 320 has been pushed far enough so that a screw 370 (e.g., an ACME screw) can catch a threaded receiver 330 of the translating piece 320. From here, the screw 370 may be advanced to draw the translating piece 320 further to the right, for establishing a desired tension of the track 120. In some examples, the screw 370 has a nut 372 fixedly attached (e.g., welded, double-nutted, etc.) to the external end to allow the screw 370 to be turned easily with tools, such as a wrench.

As the translating piece 320 is moved further to the right, a lower lip 334*b* of the translating piece eventually engages a lower rail 340*b*. The upper and lower rails 340*a* and 340*b* thus serve to hold the translating piece 320 firmly against the body.

In the example shown, the lower rail 340*b* does not extend as far to the left as the upper rail 340*a*. This arrangement allows the bracket assembly 300 to swing into the second position without interference from the lower rail 340*b*. Once the translating piece 320 moves to a point where it firmly engages with the lower rail 340*b*, the pry bar used to rotate bracket assembly 300 can be released.

It is noted that a substantially reverse process can be used to loosen and/or remove a track 120. For example, the screw 370 may be loosened and disengaged from the threaded receiver 330, such that the bracket assembly 300 clears the lower rail 340*b*. From here, the bracket assembly 300 may be rotated about the axle 312 from the second position (FIG. 5) to the first position (FIG. 4). The bracket assembly 300 can then be removed from the side of the vehicle (FIG. 3).

Figure 6:
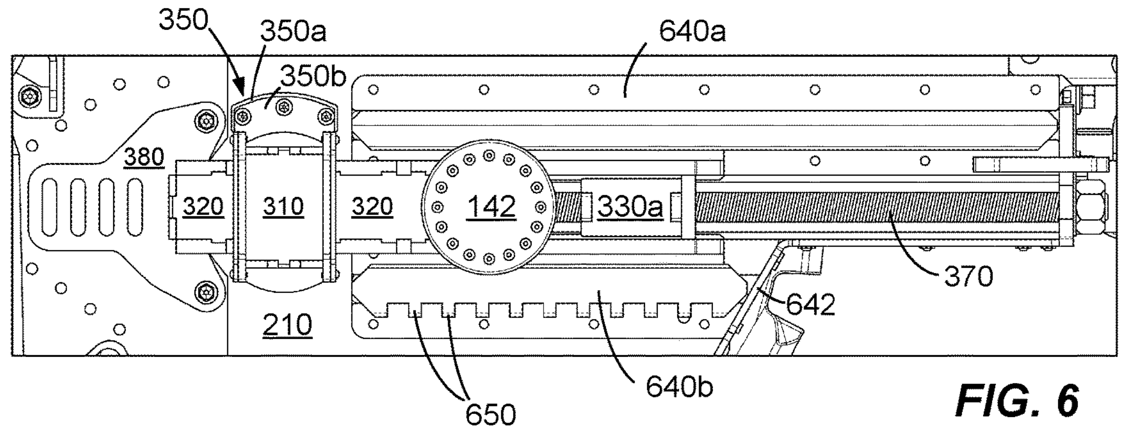
FIGS. 6-8 are perspective views of a variant of the track tensioner of FIGS. 2-5.
Figure 7:
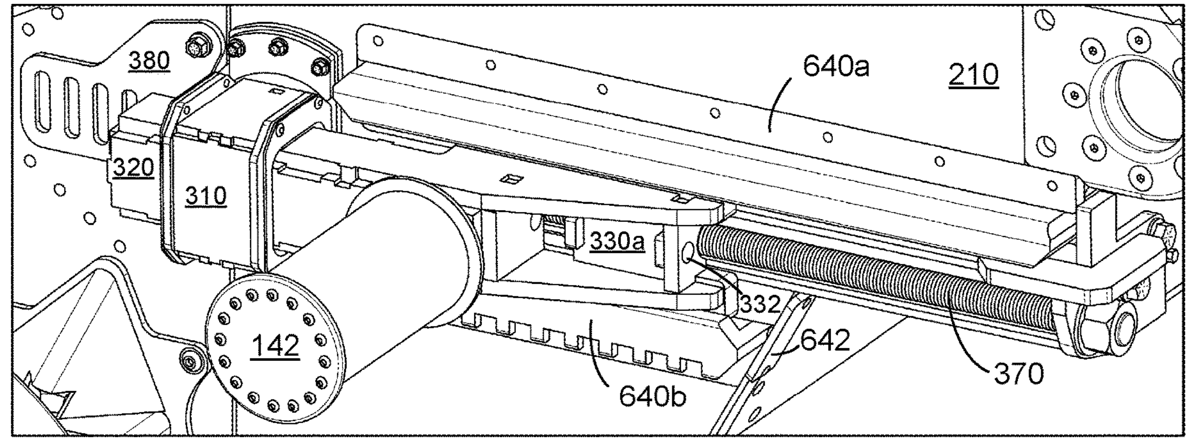
Figure 8:
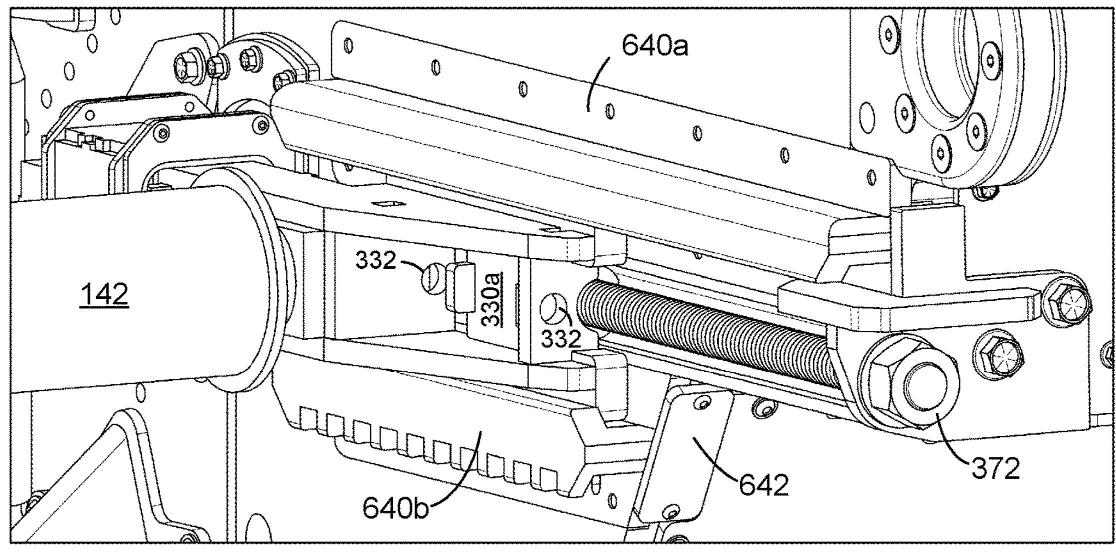
Figure 9:
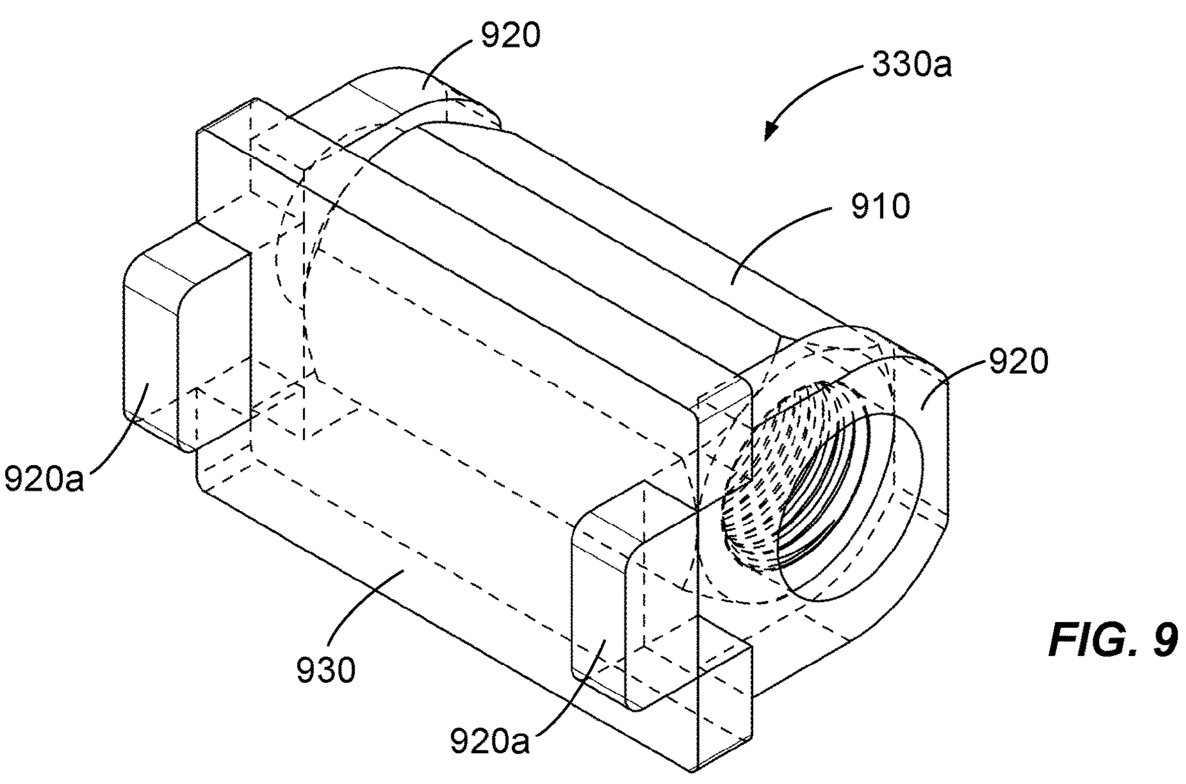
FIG. 9 is an isometric view of an example receiver for receiving a screw that adjusts track tension.

FIGS. 6-8 show a second embodiment of a track tensioner 200. Here, substantially similar or identical features are identified with the same reference numerals as are used in FIGS. 2-5. The embodiment of FIGS. 6-8 may be particularly suitable for heavy-duty applications, but it is not limited to such applications. Notable differences include a modified upper rail 640*a* and a modified lower rail 640*b*. Both rails may slide within grooves formed within the body 210 and may be held in place with covers 642 or fasteners. Rather than extending not as far to the left (from the perspective of the figures) as the upper rail 340*a*, e.g., to provide clearance when rotating the track tensioner 300 from the first position to the second position, the lower rail 640*b* in this embodiment may extend just as far to the left as the upper rail 640*a*. Sufficient clearance may be achieved by sliding the lower rail 640*b* within its groove to the right (or removing it altogether) prior to rotating the bracket assembly 300 from the first position to the second position. Once the bracket assembly 300 has reached the second position, the lower rail 640*b* may be advanced to the left (or fully inserted) such that its leftmost end aligns with the leftmost end of the upper rail 640*a*. The depicted arrangement has been found to provide a particularly stable and secure attachment of the bracket assembly 300 to the body. One should recognize that the upper and lower rails may be different lengths (as shown), or they may be the same length.

The lower rail 640*b* is seen to include teeth 650. For example, the teeth 650 provide anchor points for tools, which may be used to slide the lower rail 640*b* within its groove, e.g., if it is frozen or otherwise resistant to movement due to rust or debris. This feature may be especially useful with changing tracks, removing wheels, or doing other repairs.

FIG. 11 shows an example modified receiver 330*a* for receiving the screw 370. The receiver 330*a* includes an elongated nut 910, two end pieces 920, and a front piece 930. The components 910, 620, and 930 may be provided together as an integral unit, such as a weldment. The end pieces 920 each include a respective tab 920*a* that is useful for manual handling.

The receiver 330*a* differs from the receiver 330 of the first embodiment primarily in the absence of holes in the tabs 920*a*. Also, the tabs 920*a* in receiver 330*a* are shorter than those in receiver 330, e.g., to allow a pry bar to pass in front of them, rather than through them.

In operation, the nut 1110 is configured to capture the screw 370 when the track 120 is being tensioned. Advancing the screw 370 has the effect of pulling the receiver 330 or 330*a* (and thus the translating piece 320) to the right and increasing tension on the track 120.

In an example, the nut 910 may sit within a pocket or channel of the body 210, such that the track tensioner 300 cannot be rotated between the first position and the second position without shearing the nut or damaging the body 210. For this reason, the receiver 330*a* may be provided as a removeable part that an operator can place by hand once the bracket assembly 300 has been rotated to the second position. The tabs 920*a* may assist the operator in holding and physically manipulating the receiver 330*a* when placing it. As an alternative arrangement, the receiver 330 may be permanently attached to the bracket assembly 300 in some manner that allows it to be moved out of the way (out of the pocket) when rotating the bracket assembly 300.

Figure 10:
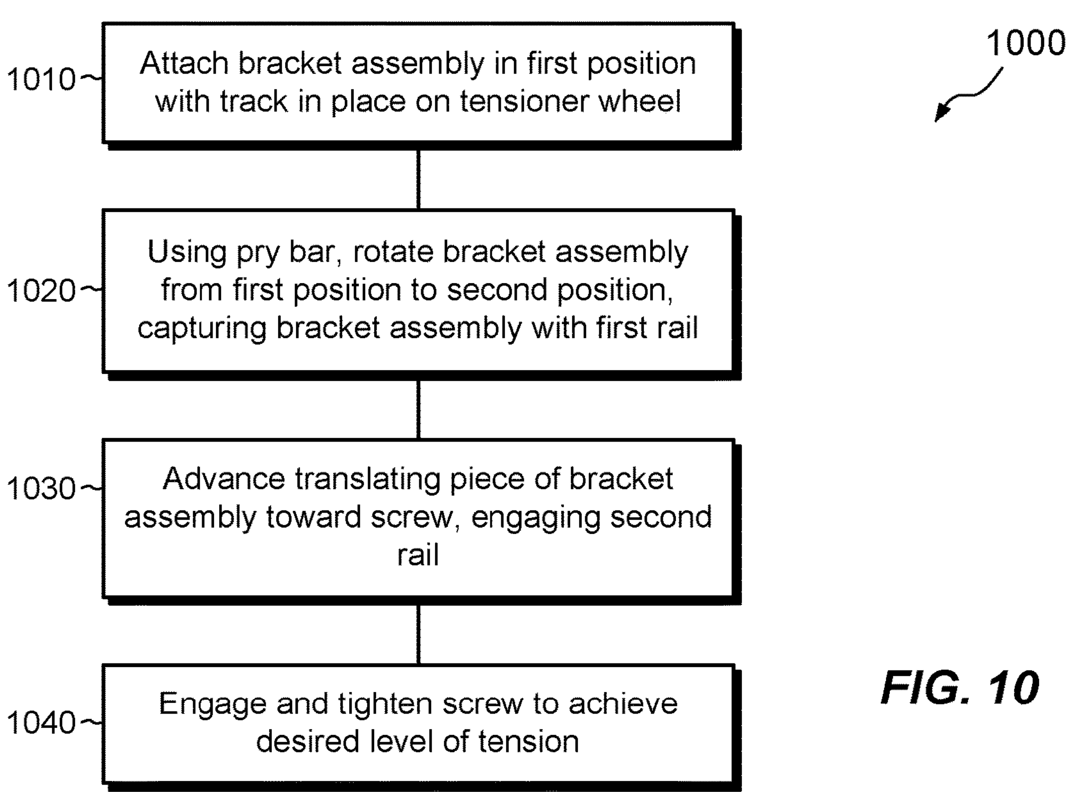
FIG. 10 is a flowchart showing an example method of tensioning a track of a tracked vehicle.

FIG. 10 shows an example method 1000 of controlling tension of a track of a tracked vehicle. The method 1000 may be performed, for example, but a human operator (or multiple operators), by one or more robots, or by a combination of human operators and robots.

At 1010, a bracket assembly 300 is attached to the body 210 of the vehicle 100 to assume a first position (FIG. 4). We assume that a track 120 is already applied to the tensioner wheel 140. At 1020, the bracket assembly 300 is rotated from the first position to the second position, such that the first rail 340*a* or 640*a* captures the translating piece 320 of the bracket assembly 300. A pry bar or other lever may be used to facilitate rotation. At 1030, the translating piece 320 is advanced toward the screw 370 until the second rail 340*b* or 640*b* is engaged. A lever may be inserted into the slot ladder 380 to assist with this operation. At 1040, the screw 370 is engaged with the receiver 330 or 330*a*, and the screw 370 is advanced to achieve a desired level of tension.

An improved technique has been described that provides a track tensioning mechanism 200 including a bracket assembly 300 coupled to an axle 142 of a tensioner wheel 140 configured to engage a track 120 to be tensioned. The bracket assembly 300 has an its own axle 312, which is configured to rotatably engage with a body 210 of a vehicle 100. The axle 312 of the bracket assembly 300 is laterally offset from the axle 142 of the tensioner wheel 140, enabling the track 120 to be loosened or tightened by rotating the bracket assembly 300 about its own axle 312 between first and second positions.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words “comprising,” “including,” “containing,” and “having” are intended to set forth certain items, steps, elements, or aspects of something in an open-ended fashion. Also, as used herein and unless a specific statement is made to the contrary, the word “set” means one or more of something. This is the case regardless of whether the phrase “set of” is followed by a singular or plural object and regardless of whether it is conjugated with a singular or plural verb. Also, a “set of” elements can describe fewer than all elements present. Thus, there may be additional elements of the same kind that are not part of the set. Further, ordinal expressions, such as “first,” “second,” “third,” and so on, may be used as adjectives herein for identification purposes. Unless specifically indicated, these ordinal expressions are not intended to imply any ordering or sequence. Thus, for example, a “second” event may take place before or after a “first event,” or even if no first event ever occurs. In addition, an identification herein of a particular element, feature, or act as being a “first” such element, feature, or act should not be construed as requiring that there must also be a “second” or other such element, feature or act. Rather, the “first” item may be the only one. Also, and unless specifically stated to the contrary, “based on” is intended to be nonexclusive. Thus, “based on” should be interpreted as meaning “based at least in part on” unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

Table of Reference Characters:

| Reference Numeral | Description |
|---|---|
| 100 | Tracked vehicle |
| 110 | Suspension carrier |
| 120 | Track |
| 130 | Drive sprocket |
| 140 | Tensioner wheel |
| 142 | Axle of tensioner wheel (first axle) |
| 150 | Bottom wheel |
| 160 | Top wheel |
| 200 | Track tensioning mechanism |
| 210 | Side of vehicle body |
| 300 | Bracket assembly |
| 310 | Housing piece (rotatably attached to body via second axle) |
| 310a | Lip of housing piece (engages under lip 950b of retainer) |
| 312 | Axle of bracket assembly 310 |
| 320 | Translating piece (moves within housing) |
| 330 | Receiver (optionally removeable; includes elongated nut extending out the back for receiving screw 810). |
| 330a | Alternative receiver (optionally removeable; includes elongated nut extending out the back for receiving screw 810) |
| 332 | Receiver (e.g., on or more holes and/or slots) for receiving pry bar |
| 334a | Upper lip of translating piece |
| 334b | Lower lip of translating piece |
| 340a | Upper rail |
| 350 | Retainer |
| 350a | Spacer (spaces retainer away from body to provide space for lip of housing piece) |
| 350b | Lip of retainer |
| 360 | Opening in body 210, e.g., bushing for receiving second axle (not shown) that extends back from housing piece 310 |
| 370 | Screw |
| 372 | Nut, optionally welded onto end of screw 370 to facilitate attachment by a tool for rotation) |
| 380 | Pry ladder (used for advancing translating piece of tensioner within housing piece). |
| 640a | Alternative embodiment of upper rail |
| 340b | Lower rail |
| 640b | Alternative embodiment of lower rail |
| 650 | Teeth, e.g., e.g., for receiving tool for loosening lower rail |
| 642 | Cover; prevents entry of debris and prevents lower rail from moving out of its containing groove |
| 710 | Teeth within alternative embodiment of lower rail 940a1 |
| 910 | Elongated nut |
| 920 | Side pieces |
| 930 | Front piece |
| 920a | Tabs (improve ability of operator to grip receiver 330a |
| 1000 | Method for tensioning track |
| 1010, 120, 1030, and 1040 | Acts of method 1000 |

What is claimed is:

1. A track tensioning mechanism for a tracked vehicle, comprising:

a tensioner wheel configured to engage a track to be tightened, the tensioner wheel having a first axle about which the tensioner wheel can rotate; and a bracket assembly coupled to the first axle and having a second axle about which the bracket assembly can rotate relative to a body of the vehicle, wherein the second axle is laterally offset from the first axle, enabling the track to be loosened or tightened by rotating the bracket assembly about the second axle between first and second positions, wherein the bracket assembly includes a housing piece from which the second axle extends and a translating piece that extends between the housing piece and the first axle, the translating piece configured to translate relative to the housing piece for varying a distance between the first axle and the second axle.

2. The track tensioning mechanism of claim 1, wherein the first axle is parallel to the second axle.

3. The track tensioning mechanism of claim 1, wherein the bracket assembly includes a pry bar receiver constructed and arranged to receive a pry bar to be used when rotating the bracket assembly about the second axle between first and second positions.

4. The track tensioning mechanism of claim 1, wherein the housing piece extends at least partially around the translating piece such that the translating piece can move back and forth within the housing piece.

5. The track tensioning mechanism of claim 1, wherein the translating piece is constructed and arranged to receive a screw that extends from a fixed point relative to the body of the vehicle and colinearly with the translating piece when the bracket assembly is in the second position, wherein the screw is constructed and arranged to move the translating piece back and forth relative to the housing piece for tightening and loosening the track.

6. The track tensioning mechanism of claim 5, further comprising a ladder of prying slots attached to or integral with the body of the vehicle, the ladder arranged in line with the screw and providing multiple slots in which a pry bar can be inserted for successively pushing the translating piece relative to the housing piece such that the translating piece can receive the screw when the bracket assembly is in the second position.

7. The track tensioning mechanism of claim 1, further comprising upper and lower rails attached to or integral with the body of the vehicle and extending parallel to the translating piece when the bracket assembly is in the second position, the upper and lower rails configured to engage upper and lower lips of the translating piece for holding the bracket assembly in the second position.

8. The track tensioning mechanism of claim 7, wherein the lower rail is moveable within a track, such that the lower rail can be moved within the track or removed from the track when rotating the bracket assembly about the second axle between the first and second positions, and such that the lower rail can be moved back or reinserted once the bracket assembly is in the second position.

9. The track tensioning mechanism of claim 1, further comprising:

an opening at a side of the vehicle for receiving the second axle; and a retainer adjacent to the opening, wherein the housing piece includes a lip configured to engage the retainer when the bracket assembly is in the second position.

10. The track tensioning mechanism of claim 9, wherein the retainer adjacent to the opening includes a retainer lip and a spacer that forms a space between the retainer lip and the side of the vehicle, and wherein the lip of the housing piece is configured to enter the space between the retainer lip and the side of the vehicle when the bracket assembly is rotated from the first position to the second position.

11. A tracked vehicle, comprising a body and first and second suspension carriers having respective tracks, each of the first and second suspension carriers including a tensioning mechanism that includes:

a tensioner wheel configured to engage a track to be tightened, the tensioner wheel having a first axle about which the tensioner wheel can rotate; and a bracket assembly coupled to the first axle and having a second axle about which the bracket assembly can rotate relative to a body of the vehicle, wherein the second axle is laterally offset from the first axle, enabling the track to be loosened or tightened by rotating the bracket assembly about the second axle between first and second positions, wherein the bracket assembly includes a pry bar receiver constructed and arranged to receive a pry bar to be used when rotating the bracket assembly about the second axle between first and second positions.

12. A method of controlling tension of a track of a tracked vehicle, comprising:

applying a bracket assembly to a body of the tracked vehicle by inserting an axle of the bracket assembly into an opening at a side of the vehicle, the bracket assembly having a translating piece coupled to an axle of a tensioner wheel around which the track turns, the bracket assembly applied in a first position in which the track is loose; and rotating the bracket assembly about the axle of the bracket assembly from the first position to a second position, the track being tighter in the second position than it is in the first position.

13. The method of claim 12, wherein rotating the bracket assembly from the first position to the second position includes inserting a pry bar into a receiver of the bracket assembly and leveraging rotation of the bracket assembly using the pry bar.

14. The method of claim 12, further comprising, with the bracket assembly in the second position, advancing the translating piece for establishing a desired track tension.

15. The method of claim 14, wherein rotating the bracket assembly from the first position to a second position includes engaging a lip of the bracket assembly with a retainer attached to or integral with the body of the vehicle.

16. The method of claim 14, wherein rotating the bracket assembly from the first position to the second position includes continuing to rotate until the translating piece engages an upper rail attached to or integral with the body of the vehicle.

17. The method of claim 16, wherein advancing the bracket assembly in the second position includes prying the translating piece such that the axle of the tensioner wheel extends farther away from the axle of the bracket assembly.

18. The method of claim 16, wherein advancing the bracket assembly in the second position includes engaging the translating piece with a lower rail attached to or integral with the body of the vehicle, such that the translating piece is held in the second position by both the upper rail from above and the lower rail from below.

19. The method of claim 14, wherein advancing the bracket assembly in the second position includes rotating a screw that extends from a fixed point relative to the body of the vehicle, such that the screw captures the translating piece and draws the axle of the tensioner wheel farther away from the axle of the bracket assembly.

* * * * *